(12) United States Patent
Wang

(10) Patent No.: US 12,273,439 B2
(45) Date of Patent: Apr. 8, 2025

(54) COMMUNICATION METHOD AND APPARATUS

(71) Applicant: HUAWEI TECHNOLOGIES CO., LTD., Guangdong (CN)

(72) Inventor: Yong Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 455 days.

(21) Appl. No.: 17/860,818

(22) Filed: Jul. 8, 2022

(65) Prior Publication Data
US 2022/0353056 A1 Nov. 3, 2022

Related U.S. Application Data

(63) Continuation of application No. PCT/CN2020/113301, filed on Sep. 3, 2020.

(30) Foreign Application Priority Data

Jan. 10, 2020 (CN) .......................... 202010025955.8

(51) Int. Cl.
H04L 9/06 (2006.01)
H04L 9/14 (2006.01)

(52) U.S. Cl.
CPC ............... *H04L 9/065* (2013.01); *H04L 9/14* (2013.01)

(58) Field of Classification Search
CPC ....... H04L 9/065; H04L 9/14; H04L 2209/84; H04L 9/0637; H04L 9/3242; H04L 63/12;
(Continued)

(56) References Cited

U.S. PATENT DOCUMENTS

2016/0315766 A1 10/2016 Ujiie et al.
2019/0109716 A1 4/2019 Mizoguchi et al.
(Continued)

FOREIGN PATENT DOCUMENTS

| CN | 106685653 A | 5/2017 |
|----|-------------|--------|
| CN | 106790053 A | 5/2017 |

(Continued)

OTHER PUBLICATIONS

Wang et al., "Computer network security," Shanghai Jiao Tong University Press, 2019, 6 pages (with English machine translation of abstract).

(Continued)

*Primary Examiner* — Izunna Okeke
(74) *Attorney, Agent, or Firm* — Fish & Richardson P.C.

(57) ABSTRACT

In an implementation, a first electronic control unit (ECU) performs an operation using a first key and a first fresh value to generate a keystream; performs an exclusive OR operation using the keystream and a to-be-transmitted first plaintext packet to generate a first ciphertext packet; and sends the first ciphertext packet to a second ECU. The first fresh value is a value generated by a counter in the first ECU when the first ECU transmits a packet, and the counter is configured to record a quantity of packets transmitted by the first ECU. The first ECU transmits the first ciphertext packet to the second ECU. This can prevent the first packet transmitted by the first ECU from being eavesdropped on, and help improve confidentiality of the packet transmitted by the first ECU.

33 Claims, 8 Drawing Sheets

(58) Field of Classification Search
CPC ... H04L 67/12; H04L 63/0428; H04L 9/0643; H04L 9/0861; H04L 9/0863; H04L 63/123
See application file for complete search history.

(56) References Cited

U.S. PATENT DOCUMENTS

| | | | | |
|---|---|---|---|---|
| 2020/0369242 | A1* | 11/2020 | Komedani | B60R 25/24 |
| 2021/0119981 | A1* | 4/2021 | Coppola | H04L 9/088 |
| 2022/0131839 | A1* | 4/2022 | Potter | H04L 63/0823 |

FOREIGN PATENT DOCUMENTS

| | | | |
|---|---|---|---|
| CN | 108075897 | A | 5/2018 |
| CN | 108965218 | A | 12/2018 |
| CN | 109672538 | A | 4/2019 |
| CN | 110377002 | A | 10/2019 |
| JP | 2005295468 | A | 10/2005 |
| JP | 2012532564 | A | 12/2012 |
| JP | 2014168216 | A | 9/2014 |
| JP | 2017200040 | A | 11/2017 |
| WO | 2013065689 | A1 | 5/2013 |

OTHER PUBLICATIONS

Handbook of Applied Cryptography, 1st ed., CRC Press, 1997, Chapter 9, pp. 366-367.
Yang et al., "Wireless Communication Security Technology," Beijing University of Posts and Telecommunications Press, May 2005, 10 pages (with English abstract).
Woo et al., "A Practical Wireless Attack on the Connected Car and Security Protocol for In-Vehicle CAN," IEEE Transactions on Intelligent Transportation Systems, Apr. 2015, vol. 16, No. 2, pp. 993-1006.
Handbook of Applied Cryptography, 1st ed., CRC Press, 1997, Chapter 7, 61 pages.
Extended European Search Report in European Appln No. 20911709. 2, dated Jan. 4, 2023, 7 pages.
Office Action in Japanese Appln. No. 2022-542134, mailed on Aug. 15, 2023, 28 pages (with English translation).
International Search Report and Written Opinion in International Appln. No. PCT/CN2020/113301, mailed on Dec. 2, 2020, 16 pages (with English translation).

* cited by examiner

COMMUNICATION METHOD AND APPARATUS

CROSS-REFERENCE TO RELATED APPLICATIONS

This application is a continuation of International Application No. PCT/CN2020/113301, filed on Sep. 3, 2020, which claims priority to Chinese Patent Application No. 202010025955.8, filed on Jan. 10, 2020. The disclosures of the aforementioned applications are hereby incorporated by reference in their entireties.

TECHNICAL FIELD

This application relates to the field of communication technologies, and in particular, to a communication method and an apparatus.

BACKGROUND

With the development of science and technology, various services in the automotive industry become increasingly mature. Many electronic control units (ECU) are configured in a vehicle system, and the ECU is a vehicle-specific microcomputer controller. A network connecting these ECUs is referred to as a controller area network (CAN). A CAN bus protocol is a serial communication bus based on a message broadcast mode. The protocol is initially used to implement reliable communication between ECUs in a vehicle, and then is widely used in other fields such as industrial automation, shipping, and medical care because of features such as simplicity, practicability, and reliability.

Currently, in a communication process based on the CAN bus protocol, a malicious attacker may eavesdrop on, modify, or perform a replay attack on a CAN packet (frame) transmitted in the communication process. To prevent the attacker from modifying or performing the replay attack on the CAN packet, there are some authentication mechanisms for the CAN packet. For example, a secure onboard communication (SecOC) mechanism in an automotive open system architecture (AUTOSAR) provides a method for secure communication based on the CAN bus protocol, to prevent the attacker from modifying or performing the replay attack on the CAN packet. However, the SecOC mechanism in the AUTOSAR cannot prevent the attacker from eavesdropping on the CAN packet.

SUMMARY

This application provides an intra-vehicle network-based communication method and an apparatus, to improve confidentiality of a packet transmitted by an ECU.

According to a first aspect, this application provides an intra-vehicle network-based communication method and an apparatus. The method may be performed by an ECU in a vehicle. The method includes: A first ECU performs an operation using a first key and a first fresh value to generate a keystream, performs an exclusive OR operation using the keystream and a to-be-transmitted first plaintext packet, to generate a first ciphertext packet. The first ECU sends the first ciphertext packet to a second ECU. The first fresh value is a value generated by a counter in the first ECU when the first ECU transmits a packet, and the counter is configured to record a quantity of packets transmitted by the first ECU.

Based on this solution, the first ECU obtains the first ciphertext packet by encrypting the first plaintext packet, and transmits the first ciphertext packet to the second ECU. This can prevent the packet transmitted by the first ECU from being eavesdropped on, and help improve confidentiality of the packet transmitted by the first ECU. Even if the ciphertext packet is stolen by an attacker, the attacker cannot obtain the plaintext packet corresponding to the ciphertext packet.

In a possible implementation, the first ECU may combine encryption protection and integrity protection. The following provides examples of three possible implementations.

Implementation 1: The first ECU first performs encryption protection and then integrity protection.

The first ECU performs the operation using the first key and the first fresh value to generate the keystream, and performs the exclusive OR operation using the keystream and the to-be-transmitted first plaintext packet to generate the first ciphertext packet. Further, the first ECU may further perform an operation using a second key, the first ciphertext packet, and the first fresh value to generate a message authentication code (MAC). The message authentication code is used by the second ECU to perform integrity check on the first plaintext packet. In a possible implementation, the first ECU arranges the first ciphertext packet, the message authentication code, and the first fresh value in a sequence, to obtain a second ciphertext packet, and the first ECU sends the second ciphertext packet to the second ECU.

Implementation 2: The first ECU simultaneously performs integrity protection and encryption protection.

The first ECU performs the operation using the first key and the first fresh value to generate the keystream, and performs the exclusive OR operation using the keystream and the first plaintext packet to generate the first ciphertext packet. In addition, the first ECU performs an operation using a second key, the first plaintext packet, and the first fresh value to generate a message authentication code, where the message authentication code is used by the second ECU to perform integrity check on the first plaintext packet; and arrange the first ciphertext packet, the message authentication code, and the first fresh value in a sequence, to obtain a second ciphertext packet. In a possible implementation, the first ECU sends the second ciphertext packet to the second ECU.

Implementation 3: The first ECU first performs integrity protection and then encryption protection.

The first ECU performs an operation using a second key and the first plaintext packet to generate a message authentication code, where the message authentication code is used by the second ECU to perform integrity check on the first plaintext packet. Further, the first ECU arranges the first plaintext packet and the message authentication code in a sequence, to obtain a second plaintext packet. Then, the first ECU performs an exclusive OR operation using the keystream and the second plaintext packet, to generate the first ciphertext packet. In a possible implementation, the first ECU sends the first ciphertext packet and the first fresh value to the second ECU.

In this application, the first key may be generated by the first ECU by performing an operation using a shared key and a first preset parameter by using a key derivation algorithm, where the shared key is a key shared by the first ECU and the second ECU. Alternatively, the first key may be preset by the first ECU. The second key may be generated by the first ECU by performing an operation using a shared key and a second preset parameter by using the key derivation algorithm, or may be preset by the first ECU.

In this application, the first ECU may further send indication information to the second ECU. The indication information is used to indicate that the first ECU performs integrity protection on the first plaintext packet, or used to indicate that the first ECU performs integrity protection and encryption protection on the first plaintext packet.

According to a second aspect, this application provides an intra-vehicle network-based communication method, and the method may be performed by an ECU in a vehicle. The method includes: A second ECU obtains a first ciphertext packet and a first fresh value, performs an operation using a first key and the first fresh value to generate a keystream, and performs an exclusive OR operation using the keystream and the first ciphertext packet to obtain a first plaintext packet. The first ciphertext packet comes from a first ECU, the first fresh value is a value generated by a counter in the first ECU when the first ECU sends a packet, the counter is configured to record a quantity of packets transmitted by the first ECU, and a shared key is a key shared by the first ECU and the second ECU.

Based on this solution, the second ECU receives the first ciphertext packet transmitted by the first ECU. This can prevent the packet received by the second ECU from being eavesdropped on, and help improve confidentiality of the packet received by the second ECU. Even if a ciphertext packet is stolen by an attacker, the attacker cannot obtain the plaintext packet corresponding to the ciphertext packet.

A sequence of performing integrity check and decryption by the second ECU may be divided into the following two cases.

Case 1: The second ECU first performs integrity check and then decryption, or simultaneously performs integrity check and decryption.

The second ECU receives a second ciphertext packet from the first ECU, where the second ciphertext packet is obtained by arranging the first ciphertext packet, a message authentication code, and the first fresh value in a sequence; obtains the first ciphertext packet, the message authentication code, and the first fresh value from the second ciphertext packet; and when determining that the first fresh value is greater than a second fresh value, performs an operation using a second key, the first ciphertext packet, and the first fresh value to generate a new message authentication code. If it is determined that the new message authentication code is consistent with the obtained message authentication code, integrity check succeeds. The second fresh value is a fresh value locally stored when the second ECU receives the second ciphertext packet. Then, the second ECU performs the operation using the first key and the first fresh value to generate the keystream, and performs the exclusive OR operation using the keystream and the first ciphertext packet to obtain the first plaintext packet.

Case 2: The second ECU first performs decryption and then integrity check.

The case 2 may be divided into the following two cases.

Case 2.1: The second ECU receives the first ciphertext packet and the first fresh value from the first ECU, and the second ECU performs an exclusive OR operation using the keystream and the first ciphertext packet to obtain a second plaintext packet, where the second plaintext packet is obtained by arranging the first plaintext packet and a message authentication code in a sequence.

Further, optionally, the second ECU performs an operation using a second key, the first plaintext packet, and the first fresh value to generate a new message authentication code; and if determining that the new message authentication code is consistent with the obtained message authentication code, determines that the first plaintext packet is complete.

Case 2.2: The second ECU receives a second ciphertext packet from the first ECU, where the second ciphertext packet is obtained by arranging the first ciphertext packet, a message authentication code, and the first fresh value in a sequence; and obtains the first ciphertext packet, the message authentication code, and the first fresh value from the second ciphertext packet. When determining that the first fresh value is greater than a second fresh value, the second ECU performs an operation using a second key, the first plaintext packet, and the first fresh value to generate a new message authentication code. If it is determined that the new message authentication code is consistent with the obtained message authentication code, integrity check succeeds. The second fresh value may be a fresh value locally stored when the second ECU receives the second ciphertext packet.

In a possible implementation, the first key may be generated by the second ECU by performing the operation using the shared key and the first preset parameter by using the key derivation algorithm, and the shared key is a key shared by the first ECU and the second ECU. Alternatively, the first key may be preset by the second ECU. The second key may be generated by the second ECU by performing an operation using a shared key and a second preset parameter by using the key derivation algorithm, or may be preset by the second ECU.

In a possible implementation, the second ECU may further receive indication information from the first ECU, where the indication information is used to indicate that the first ECU performs integrity protection on the first plaintext packet or used to indicate that the first ECU performs integrity protection and encryption protection on the first plaintext packet. After the second ECU receives the indication information used by the first ECU to indicate that the first ECU performs integrity protection on the first plaintext packet, the second ECU performs integrity check on the first plaintext packet after decryption.

According to a third aspect, this application provides a communication apparatus. The communication apparatus has a function of implementing the first ECU in the first aspect or the second ECU in the second aspect. The function may be implemented by using hardware, or may be implemented by using hardware executing corresponding software. The hardware or software includes one or more units or modules corresponding to the foregoing function.

In a possible implementation, the communication apparatus may be an ECU, or a module that can be used in an ECU, such as a chip, a chip system, or a circuit. For beneficial effects, refer to the descriptions in the first aspect or the second aspect. Details are not described herein again. The communication apparatus may include a transceiver and a processor. The processor may be configured to support the communication apparatus in performing a corresponding function of the foregoing ECU. The transceiver is configured to support the communication apparatus in communicating with another ECU or the like. The transceiver may be an independent receiver, an independent transmitter, a transceiver integrated with a receiving/transmission function, or an interface circuit. Optionally, the communication apparatus may further include a memory, and the memory may be coupled to the processor, and stores program instructions and data that are used to the communication apparatus.

According to a fourth aspect, this application provides a communication apparatus, configured to implement the method according to any one of the first aspect or the possible implementations of the first aspect, or configured to implement the method according to any one of the second aspect or the possible implementations of the second aspect.

The communication apparatus includes corresponding function modules, respectively configured to implement steps in the foregoing method. The function may be implemented by using hardware, or may be implemented by using hardware executing corresponding software. The hardware or software includes one or more modules corresponding to the foregoing function.

In a possible implementation, the communication apparatus may be an ECU, and the communication apparatus may include a processing module and a transceiver module. These modules may perform corresponding functions of the ESUs in the foregoing method examples. For details, refer to the detailed descriptions in the method examples. Details are not described herein again.

According to a fifth aspect, this application provides a communication system. The communication system includes a first ECU and a second ECU. The first ECU may be configured to perform the method in any one of the first aspect or the possible implementations of the first aspect, and the second ECU may be configured to perform the method in any one of the second aspect or the possible implementations of the second aspect.

According to a sixth aspect, this application provides a computer-readable storage medium. The computer-readable storage medium stores computer programs or instructions. When the computer programs or the instructions are executed by a communication apparatus, the communication apparatus is enabled to perform the method in any one of the first aspect or the possible implementations of the first aspect, or the communication apparatus is enabled to perform the method in any one of the second aspect or the possible implementations of the second aspect.

According to a seventh aspect, this application provides a computer program product. The computer program product includes computer programs or instructions. When the computer programs or the instructions are executed by a communication apparatus, the method in any one of the first aspect or the possible implementations of the first aspect is implemented, or the method in any one of the second aspect or the possible implementations of the second aspect is implemented.

DESCRIPTION OF EMBODIMENTS

The following describes in detail embodiments of this application with reference to accompanying drawings.

Figure 1:
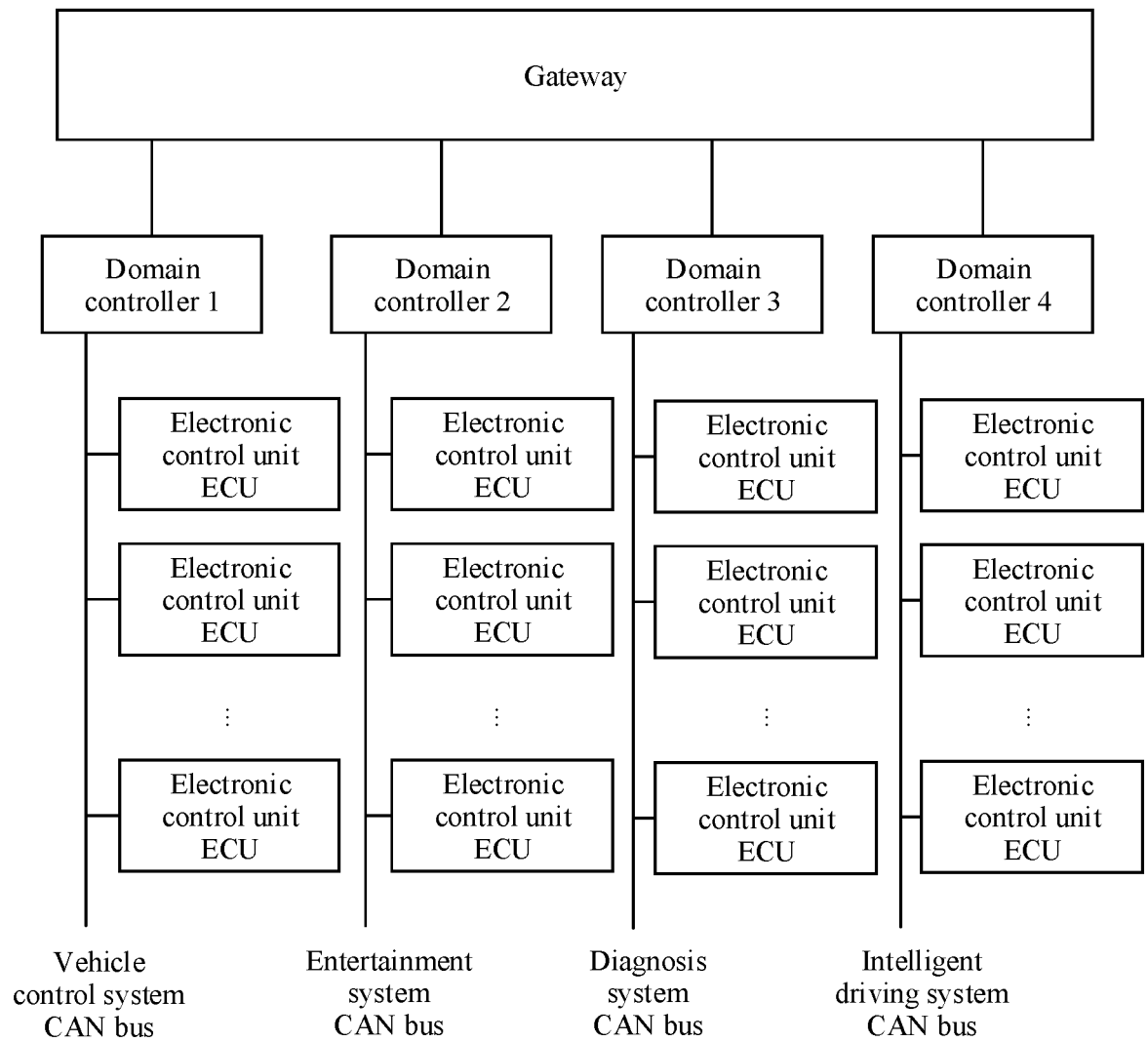
FIG. 1 is a schematic diagram of an architecture of a communication system according to this application.

FIG. 1 is a schematic diagram of an architecture of a communication system to which this application is applicable. For example, the communication system is an electronic and electrical (E/E) system. The communication system may include a gateway, domain controllers, electronic control units (ECU), and at least one CAN bus. The communication system may be divided into a plurality of different domains based on functions. Each domain may include at least one domain controller, and each domain controller is configured to manage a plurality of ECUs connected to one or more CAN buses in a domain. As shown in FIG. 1, a domain controller 1 is configured to manage a plurality of ECUs connected to a vehicle control system CAN bus in a domain, a domain controller 2 is configured to manage a plurality of ECUs connected to an entertainment system CAN bus in a domain, a domain controller 3 is configured to manage a plurality of ECUs connected to a diagnosis system CAN bus in a domain, and a domain controller 4 is configured to manage a plurality of ECUs connected to an intelligent driving system CAN bus in a domain. The domain controller can also be an ECU. Each domain controller in the communication system belongs to the gateway. As shown in FIG. 1, the domain controllers 1, 2, 3, and 4 belong to the gateway. For example, the gateway is configured to isolate an ECU outside the communication system from the communication system, and can implement protocol conversion between the ECUs in the communication system. The gateway may also be an ECU. FIG. 1 is only a schematic diagram. The communication system may further include another device, for example, may further include a relay device, which is not shown in FIG. 1. Quantities of gateways, domain controllers, and ECUs connected to various CAN buses that are included in the communication system are not limited in this application.

The communication system may include a vehicle having a communication function, a vehicle-mounted device, a wireless terminal in self driving, an intra-vehicle network chip, and the like. A scenario to which the communication system is applicable is not limited in this application.

It should be noted that system architectures and application scenarios described in this application are intended to describe the technical solutions in this application more clearly, but are not intended to limit the technical solutions provided in this application. A person of ordinary skill in the art may know that as system architectures evolve and a new scenario emerges, the technical solutions provided in this application are also applicable to a similar technical problem.

The following explains and describes some terms in this application, to facilitate understanding by a person skilled in the art.

1. Replay Attack

A replay attack, also known as a playback attack or repeat attack, is a type of attack in which an attacker sends a packet that has been received by a target host to spoof a system, and is mainly used to damage authentication correctness in an identity authentication process.

A basic principle of the replay attack is to retransmit eavesdropped data to a receiver without any change. For example, the system simply encrypts authentication information before transmitting the authentication information. In this case, although the attacker cannot eavesdrop on a password, the attacker can intercept an encrypted password and replay the encrypted password to launch the attack in such a manner.

2. Keystream

A long keystream is generated by using a short random key (also called an actual key or a seed key), and the long keystream is used to encrypt plaintext or decrypt ciphertext, so that the short key can be used to encrypt longer plaintext or decrypt longer ciphertext.

3. Protocol Data Unit (PDU)

In a hierarchical network structure, for example, in an open systems interconnection (OSI) model, a PDU is established at each layer of a transmission system. The PDU includes information from an upper layer and additional information from an entity at a current layer. This PDU is delivered to a next lower layer.

4. Exclusive OR (Xor)

A mathematical symbol of exclusive OR is "⊕". If a and b are different, an exclusive OR result is 1; or if a and b are the same, an exclusive OR result is 0.

5. Least Significant Bit (LSB)

LSB refers to bit 0 (namely, least significant bit) in a binary number and has a weight of $2^0$. In a big-endian order, LSB refers to a rightmost bit.

6. Most Significant Bit (MSB)

MSB refers to bit n−1 in an n-bit binary number and has a highest weight $2^{(n-1)}$. The MSB corresponds to the LSB. In a big-endian order, MSB refers to a leftmost bit.

With reference to FIG. 2 to FIG. 7, the following describes in detail an intra-vehicle network-based communication method provided in this application. In this application, "at least one" means one or more, and "a plurality of" means two or more. "At least one of the following items (pieces)" or a similar expression thereof indicates any combination of these items, including a single item (piece) or any combination of a plurality of items (pieces). For example, at least one of a, b, or c may indicate a, b, c, "a and b", "a and c", "b and c", or "a, b, and c", where a, b, and c may be singular or plural. The term "and/or" describes an association relationship between associated objects and represents that three relationships may exist. For example, A and/or B may represent the following three cases: Only A exists, both A and B exist, and only B exists. A and B may be in a singular or plural form. The symbol "/" in the text description of this application generally represents an "or" relationship between associated objects. In a formula of this application, the symbol "/" indicates a "division" relationship between associated objects.

It may be understood that various numbers in embodiments of this application are merely used for differentiation for ease of description, and are not used to limit the scope of embodiments of this application. The sequence numbers of the foregoing processes do not mean an execution sequence, and the execution sequence of the processes should be determined based on functions and internal logic of the processes. The terms "first", "second", and the like are used to distinguish between similar objects, and do not need to be used to describe a specific order or sequence. In addition, the terms "include", "have", and any variant thereof are intended to cover non-exclusive inclusion, for example, include a series of steps or modules. Methods, systems, products, or devices are not necessarily limited to those steps or modules that are literally listed, but may include other steps or modules that are not literally listed or that are inherent to such processes, methods, products, or devices.

This application provides the intra-vehicle network-based communication method. The method is applicable to the communication system shown in FIG. 1. A first ECU and a second ECU may be any two ECUs in FIG. 1. The ECUs shown in FIG. 1 each store a shared key (secret key K). In other words, the first ECU and the second ECU may be two ECUs located in a same vehicle, and the first ECU and the second ECU each store a shared key. Further, optionally, the method is applicable to a secure onboard communication (SecOC) mechanism in an automotive open system architecture (AUTOSAR). This provides confidentiality protection for a packet transmitted through SecOC, and is compatible with an existing SecOC mechanism.

Figure 2:
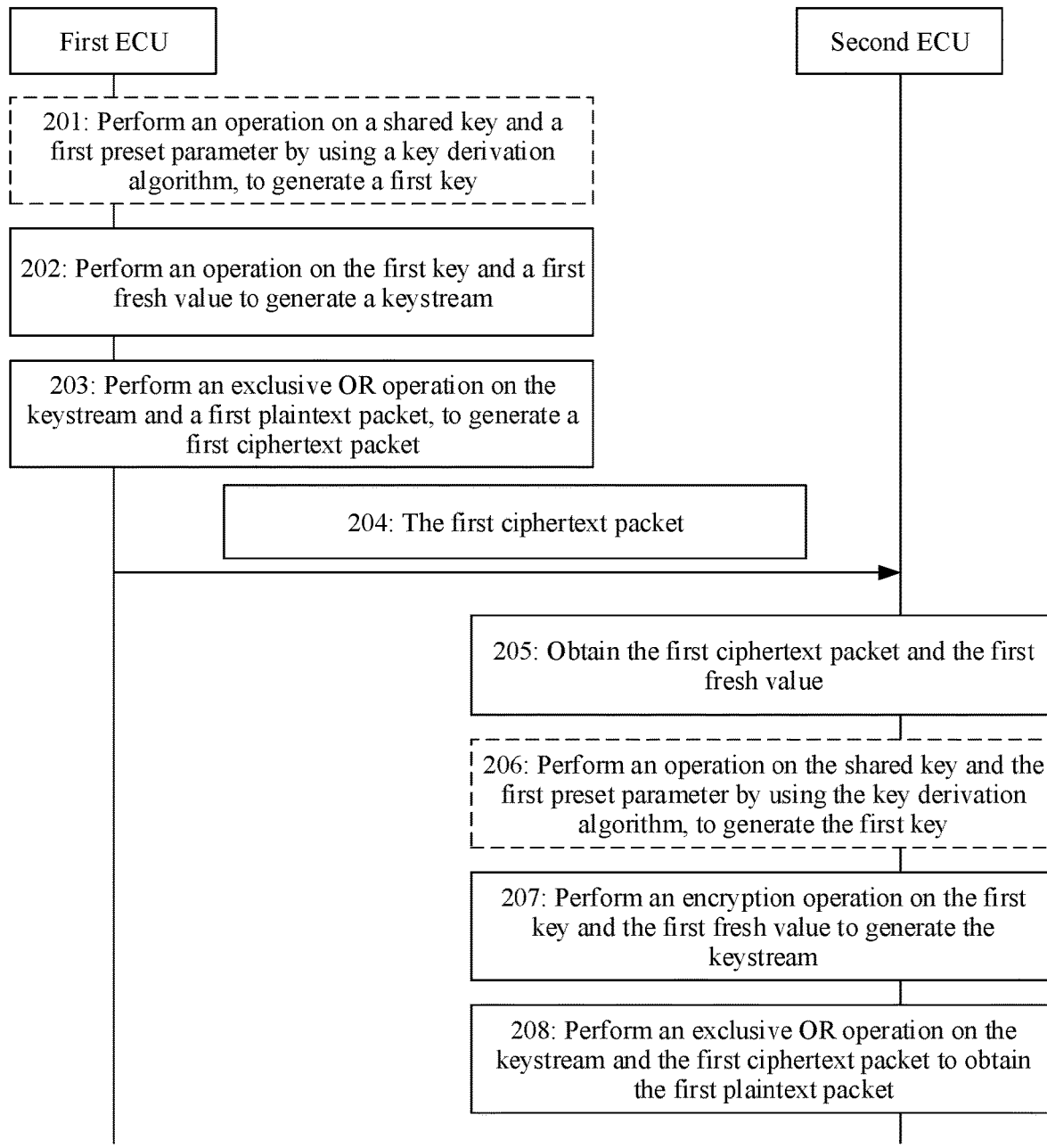
FIG. 2 is a schematic flowchart of an intra-vehicle network-based communication method according to this application.

FIG. 2 is a schematic flowchart of an intra-vehicle network-based communication method according to this application. The method includes the following steps.

Step 201: A first ECU performs an operation using a shared key and a first preset parameter by using a key derivation algorithm, to generate a first key. The shared key is a key shared by the first ECU and a second ECU.

Step 201 is an optional step. For example, the first key may alternatively be preset by the first ECU.

It may also be understood that input to the key derivation algorithm includes the shared key and the first preset parameter, and output is the first key. The key derivation algorithm may be a key derivation function (KDF). The first key is a key used by the first ECU to encrypt a first plaintext packet, and the first preset parameter is used to indicate that the first key needs to be generated.

Further, optionally, the input to the key derivation algorithm may further include one or more of an identifier of the first plaintext packet, a first fresh value (counter, CNT), an identifier of a CAN, and an identifier of an ECU. The identifier of the first plaintext packet may uniquely identify one first plaintext packet, and the first fresh value is a value generated by a counter in the first ECU when the first ECU transmits a packet. In a possible case, the first ECU locally maintains the counter, and the counter is configured to record a quantity of packets transmitted by the first ECU. For example, when the first ECU sends a first plaintext packet, the first fresh value generated by the counter is increased by 1. The identifier of the CAN is an identifier of a CAN bus connected to the first ECU. With reference to FIG. 1, if the first ECU is the ECU connected to the vehicle control system CAN bus, the identifier of the CAN is an identifier of the vehicle control system CAN bus; or if the first ECU is the ECU connected to the diagnosis system CAN bus, the identifier of the CAN is an identifier of the diagnosis system CAN bus. The identifier of the ECU may uniquely identify one ECU, namely, an identifier of the first ECU.

Step 202: The first ECU performs an operation using the first key and the first fresh value to generate a keystream.

Figure 3:
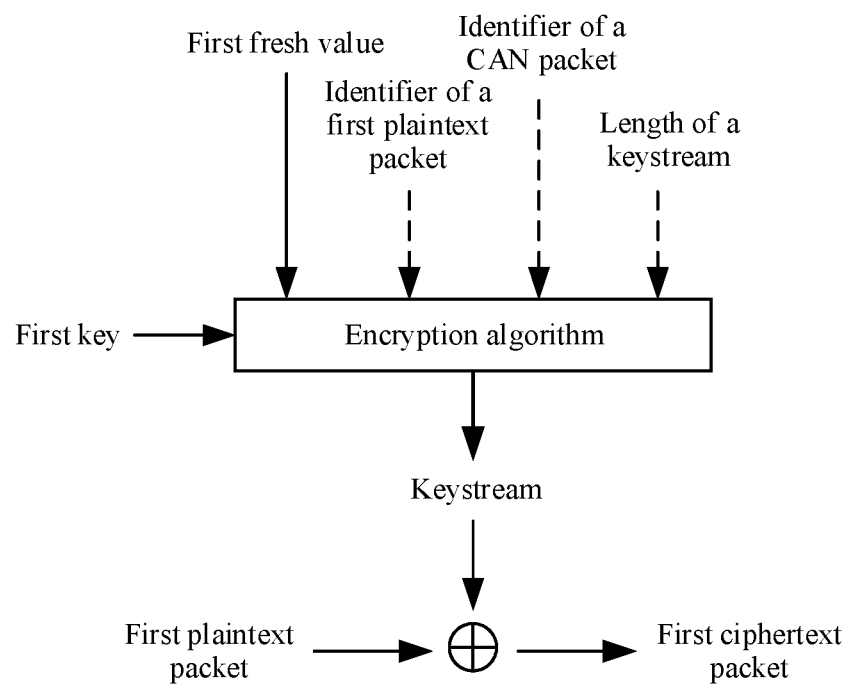
FIG. 3 is a schematic diagram of a process of generating a ciphertext packet according to this application.

Herein, the operation for generating the keystream may be based on an encryption algorithm, or may be based on a KDF. It may also be understood that the first ECU may perform the operation using the first key and the first fresh value that are entered into the KDF, to output the keystream; or the first ECU may perform the operation using the first key and the first fresh value that are entered into the encryption algorithm, to output the keystream. Refer to FIG. 3.

Further, input for generating the keystream may further include a length of the keystream, an identifier of a CAN packet and/or an identifier of a to-be-transmitted first plaintext packet. It should be understood that the length of the keystream may also be a default length set by the first ECU.

Step 203: The first ECU performs an exclusive OR operation using the keystream and the first plaintext packet, to generate a first ciphertext packet.

That is, the first ciphertext packet may be obtained by the keystream ⊕ the first plaintext packet (refer to FIG. 3), where the first plaintext packet transmitted by the first ECU may be PDU data.

Step 204: The first ECU sends the first ciphertext packet to the second ECU.

Step 205: The second ECU obtains the first ciphertext packet and the first fresh value.

In a possible implementation, the second ECU may receive the first ciphertext packet and the first fresh value from the first ECU. That is, the first ECU may send the first ciphertext packet and the first fresh value to the second ECU.

In another possible implementation, the second ECU may obtain the first ciphertext packet from the first ECU, and obtain the first fresh value from another device (for example, the domain controller or the gateway in the communication system shown in FIG. 1).

In still another possible implementation, the second ECU may decrypt the first ciphertext packet from the first ECU to obtain the first fresh value.

Step 206: The second ECU performs an operation using the shared key and the first preset parameter by using the key derivation algorithm, to generate the first key.

Herein, the shared key is shared by the second ECU and the first ECU, and the first preset parameter and the key derivation algorithm may be agreed upon in advance by the first ECU and the second ECU. In addition, for step 206, refer to the description in step 201. Details are not described herein again.

Step 206 is optional, and the first key may be preset by the second ECU.

Step 207: The second ECU performs an operation using the first key and the first fresh value to generate the keystream.

For step 207, refer to the description in step 202, that is, the first ECU in step 202 is replaced with the second ECU. Details are not described herein again.

Step 208: The second ECU performs an exclusive OR operation using the keystream and the first ciphertext packet to obtain the first plaintext packet.

In other words, the exclusive OR operation is performed on the keystream and the first plaintext packet, to obtain the first ciphertext packet. On the contrary, the exclusive OR operation is performed on the keystream and the first ciphertext packet, to obtain the first plaintext packet.

It can be learned from the foregoing step 201 to step 208 that, the first ECU obtains the first ciphertext packet by encrypting the first plaintext packet, and transmits the first ciphertext packet to the second ECU. This can prevent the packet transmitted by the first ECU from being eavesdropped on, and help improve confidentiality of the packet transmitted by the first ECU. Even if the first ciphertext packet is stolen by an attacker, the attacker cannot obtain the first plaintext packet corresponding to the first ciphertext packet.

In this application, the first ECU can further perform integrity protection on the first plaintext packet, to prevent the attacker from tampering with and performing a replay attack on the first plaintext packet. In other words, the first ECU can perform integrity protection and encryption protection on the to-be-transmitted first plaintext packet. In this way, not only the first plaintext packet can be prevented from being eavesdropped on, but also the first plaintext packet can be prevented from being performed a replay attack, and tampered with. The following provides examples of three possible implementations of combining integrity protection and encryption protection. Descriptions are provided below by using an example in which the operation for generating the keystream is based on the encryption algorithm, and the second ECU obtains the first fresh value from the first ECU.

Implementation 1: The first ECU first performs encryption protection and then integrity protection.

Figure 4:
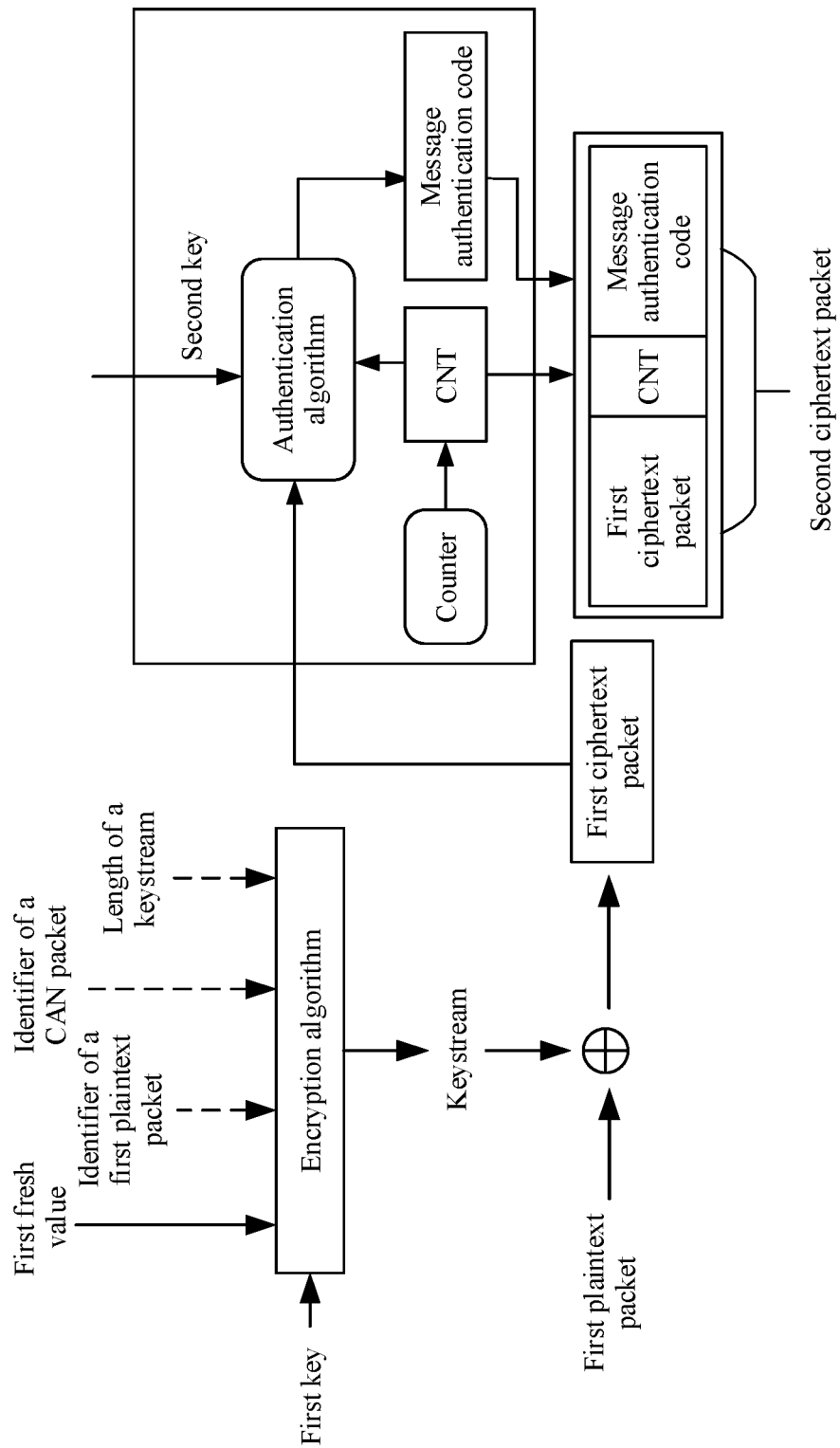
FIG. 4 is a schematic flowchart of a method for first performing encryption protection and then integrity protection according to this application.

FIG. 4 is a schematic flowchart of a method for first performing encryption protection and then integrity protection according to this application. The first ECU may perform the operation using the shared key and the first preset parameter by using the key derivation algorithm to generate the first key; perform the operation using the first key and the first fresh value to generate the keystream; and perform the exclusive OR operation using the keystream and the first plaintext packet to obtain the first ciphertext packet.

Further, the first ECU performs an operation using the shared key and a second preset parameter by using the key derivation algorithm, to generate a second key; and performs an operation using the second key, the first ciphertext packet, and the first fresh value, to generate a message authentication code.

In a possible implementation, the first ECU may arrange the first ciphertext packet, the message authentication code, and the first fresh value in a sequence. For example, the message authentication code is placed behind the first fresh value, and the first fresh value is placed behind the first ciphertext packet. For another example, the first fresh value is placed behind the message authentication code, and the first ciphertext packet is placed behind the first fresh value. The first ECU obtains a second ciphertext packet, and sends the second ciphertext packet to the second ECU.

In Implementation 1, the second ECU can first perform integrity check, and then perform decryption; or may simultaneously perform integrity check and decryption.

In a possible implementation, after receiving the second ciphertext packet from the first ECU, the second ECU may separately obtain the first ciphertext packet, the message authentication code, and the first fresh value. If the second ECU determines that the first fresh value is greater than a second fresh value, it indicates that the first plaintext packet is not under the replay attack. The second fresh value is a fresh value locally stored when the second ECU receives the second ciphertext packet. Further, the second ECU performs an operation using the shared key and the second preset parameter by using the key derivation algorithm, to generate the second key; and performs an operation using the second key, the first ciphertext packet, and the first fresh value, to generate a new message authentication code. If the second ECU determines that the new message authentication code is consistent with the obtained message authentication code, integrity check succeeds, that is, the first plaintext packet is not tampered with or performed a replay attack; or if the second ECU determines that the new message authentication code is inconsistent with the message authentication code obtained from the second ciphertext packet, integrity check fails. If integrity check succeeds, it indicates that both the first plaintext packet and the first fresh value that are received by the second ECU are complete and are not tampered with.

If it is determined that integrity check succeeds, the second ECU decrypts the first ciphertext packet. A specific process may be as follows: The second ECU performs the operation using the shared key and the first preset parameter by using the key derivation algorithm, to generate the first key; performs the operation using the first key and the first fresh value, to generate the keystream; and performs the exclusive OR operation using the keystream and the first ciphertext packet, to obtain the first plaintext packet. The first plaintext packet is a valid message transmitted by the first ECU to the second ECU.

If the second ECU determines that integrity check fails, the second ECU does not need to perform a process of decrypting the first ciphertext packet. In this way, if the second ECU first performs integrity check, and when integrity check fails, the decryption process does not need to be performed.

Implementation 2: The first ECU simultaneously performs encryption protection and integrity protection.

Figure 5:
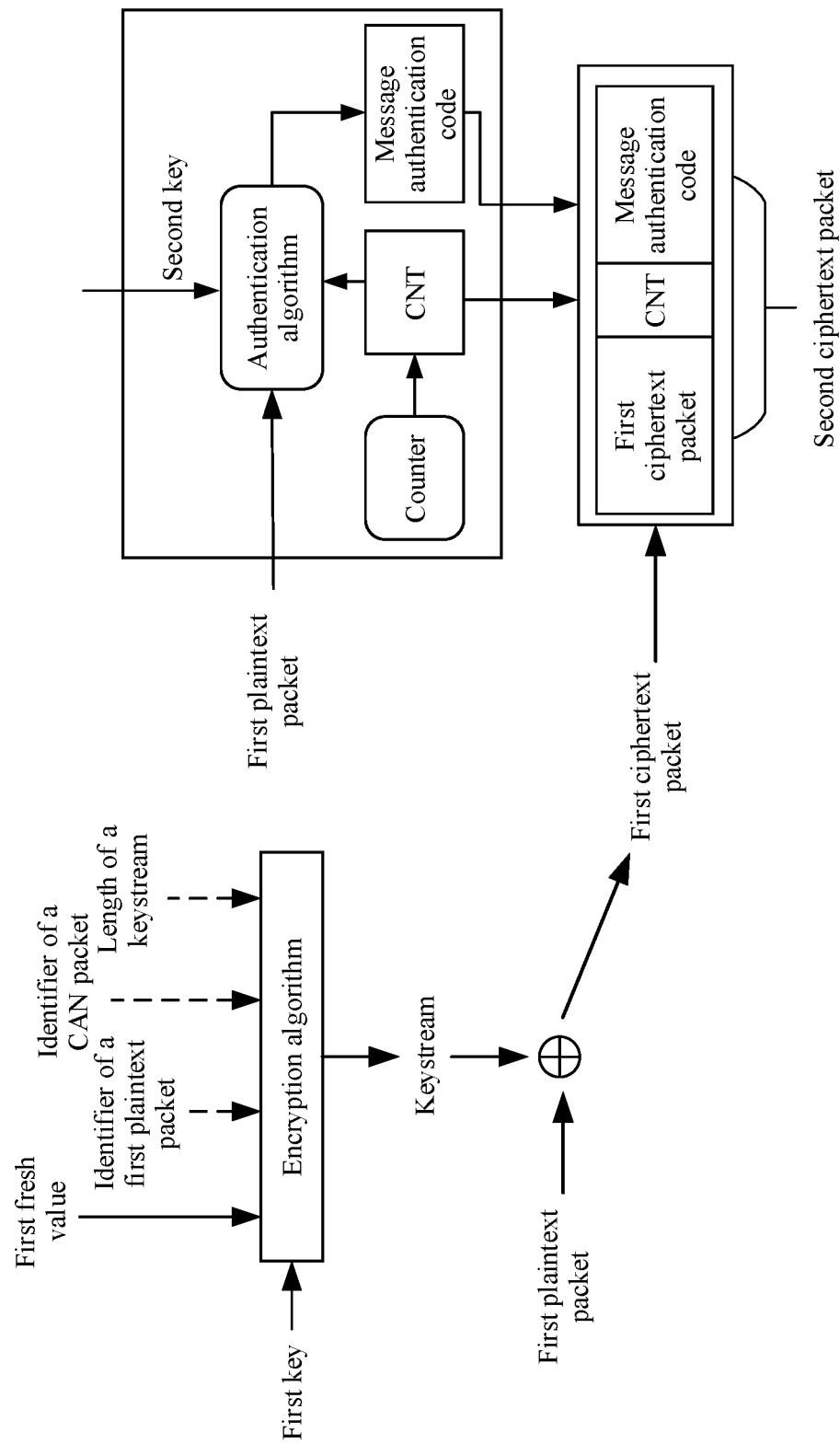
FIG. 5 is a schematic flowchart of a method for simultaneously performing integrity protection and encryption protection according to this application.

FIG. 5 is a schematic flowchart of a method for simultaneously performing integrity protection and encryption protection according to this application. The first ECU performs an operation using the shared key and a second preset parameter by using the key derivation algorithm, to generate a second key; and performs an operation using the second key, the first plaintext packet, and the first fresh value, to generate a message authentication code.

In addition, the first ECU may perform the operation using the shared key and the first preset parameter by using the key derivation algorithm to generate the first key, and perform the operation using the first key and the first fresh value to generate the keystream; perform the exclusive OR operation using the keystream and the first plaintext packet to obtain the first ciphertext packet; and arrange the first ciphertext packet, the message authentication code, and the first fresh value in a sequence. For example, the message authentication code is placed behind the first fresh value, and the first fresh value is placed behind the first ciphertext packet. For another example, the first fresh value is placed behind the message authentication code, and the first ciphertext packet is placed behind the first fresh value. The first ECU may obtain a second ciphertext packet, and send the second ciphertext packet to the second ECU.

In Implementation 2, because the message authentication code is generated based on the first plaintext packet, the second ECU needs to first perform decryption to obtain the first plaintext packet, and then perform integrity check.

In a possible implementation, the second ECU receives the second ciphertext packet from the first ECU, where the second ciphertext packet is obtained by arranging the first ciphertext packet, the message authentication code, and the first fresh value in a sequence. The second ECU may separately obtain the first ciphertext packet, the message authentication code, and the first fresh value from the second ciphertext packet. The second ECU performs the operation using the shared key and the first preset parameter by using the key derivation algorithm, to generate the first key; performs the operation using the first key and the first fresh value, to generate the keystream; and performs the exclusive OR operation using the keystream and the first ciphertext packet, to obtain the first plaintext packet. If determining that the first fresh value is greater than a second fresh value, the second ECU performs an operation using the shared key and the second preset parameter by using the key derivation algorithm, to generate the second key, where the second fresh value is a fresh value locally stored when the second ECU receives the second ciphertext packet; and performs an operation using the second key, the first plaintext packet, and the first fresh value to generate a new message authentication code. If the second ECU determines that the new message authentication code is consistent with the obtained message authentication code, integrity check succeeds; or if the second ECU determines that the new message authentication code is inconsistent with the obtained message authentication code, integrity check fails.

Implementation 3: The first ECU first performs integrity protection and then encryption protection.

Figure 6:
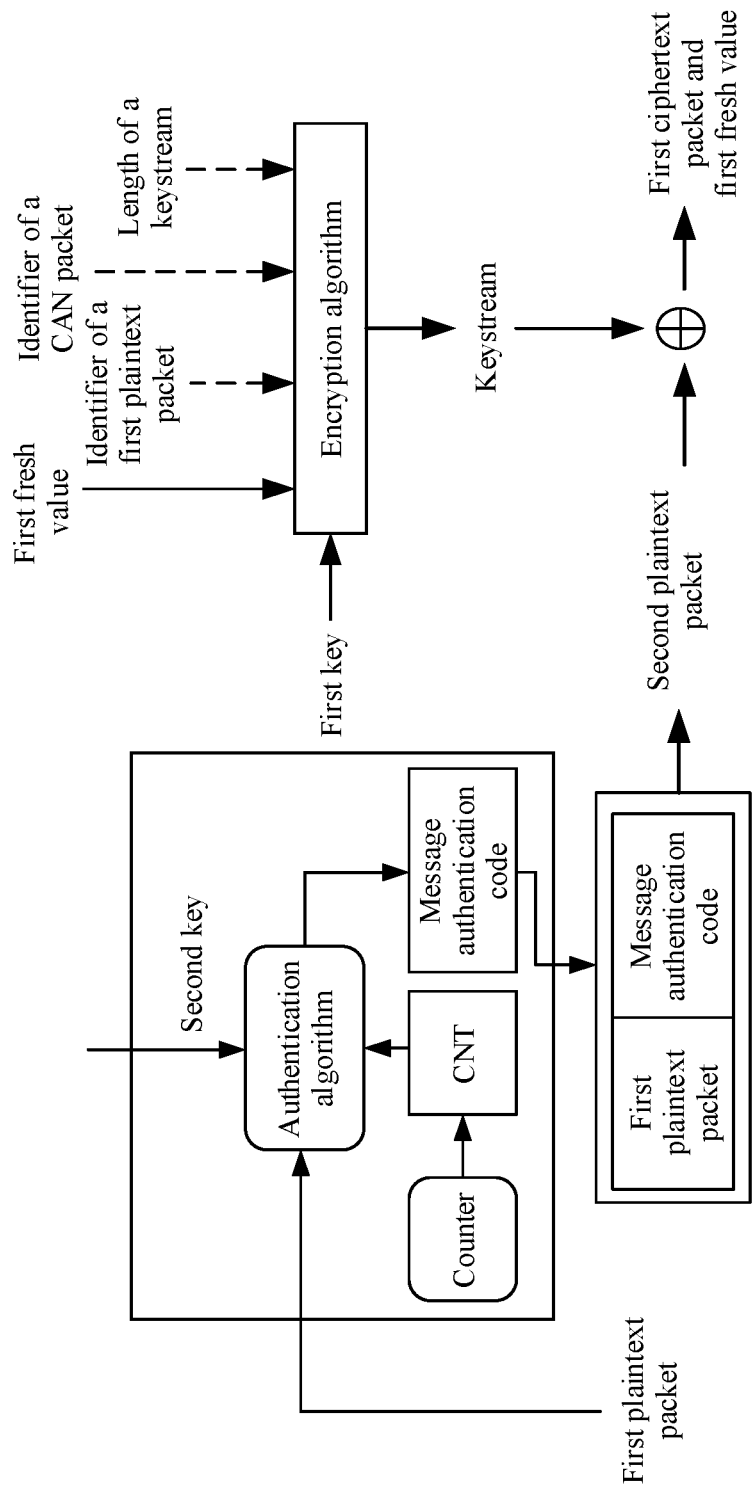
FIG. 6 is a schematic flowchart of a method for first performing integrity protection and then encryption protection according to this application.

FIG. 6 is a schematic flowchart of a method for first performing integrity protection and then encryption protection according to this application. The first ECU performs an operation using the shared key and a second preset parameter by using the key derivation algorithm, to generate a second key; performs an operation using the second key, the first plaintext packet, and the first fresh value, to generate a message authentication code; and arranges the first plaintext packet and the message authentication code in a sequence. For example, the message authentication code is placed behind the first plaintext packet. For another example, the first plaintext packet is placed behind the message authentication code. The first ECU obtains a second plaintext packet. Further, the first ECU performs the operation using the first key and the first fresh value to generate the keystream; performs the exclusive OR operation using the keystream and the second plaintext packet to generate the first ciphertext packet; and sends the first ciphertext packet and the first fresh value to the second ECU.

In Implementation 3, because the message authentication code generated by the first ECU is based on the first plaintext packet, the second ECU first needs to perform decryption to obtain the first plaintext packet, and then performs integrity check.

In a possible implementation, the second ECU receives the first ciphertext packet and the first fresh value from the first ECU; performs an operation using the shared key and the first preset parameter by using the key derivation algorithm to generate the first key; performs an operation using the first key and the first fresh value to generate the keystream; and performs an exclusive OR operation using the keystream and the first ciphertext packet to obtain the second plaintext packet. The second plaintext packet is obtained by arranging the first plaintext packet, the first fresh value, and the message authentication code in a sequence. In other words, the second ECU obtains the first plaintext packet, the first fresh value, and the message authentication code from the second plaintext packet.

To ensure that the first plaintext packet obtained through decryption is not under the replay attack and is not tampered with, the second ECU performs an operation using the shared key and the second preset parameter by using the key derivation algorithm, to generate the second key, and performs an operation using the second key, the first plaintext packet, and the first fresh value, to generate a new message authentication code. If the second ECU determines that the new message authentication code is consistent with the obtained message authentication code, integrity check succeeds; or if the second ECU determines that the new message authentication code is inconsistent with the obtained message authentication code, integrity check fails, and the first plaintext packet may be directly discarded.

In the foregoing three implementations, in a possible implementation, after determining that check succeeds, the second ECU may update the obtained first fresh value to the locally stored second fresh value.

It should be noted that, in the foregoing three implementations, to further improve security of the packet transmitted by the first ECU, the first key used for encryption and the second key used for integrity protection are different. For example, different preset parameters (for example, an algorithm type parameter (an algorithm type distinguisher)) are entered for implementation. For example, a preset parameter for generating the first key is the first preset parameter, a preset parameter for generating the second key is the second preset parameter, and the first preset parameter and the second preset parameter are different. For example, the first preset parameter may be "0x01", and the second preset parameter may be "0x02". For another example, the first preset parameter is "encryption", and the second preset parameter is "integrity". In addition, the first preset parameter and the key derivation algorithm may be agreed upon by the first ECU and the second ECU.

In this application, the input for generating the first ciphertext packet may further include one or more of the identifier of the first plaintext packet, the identifier of the CAN packet, and the length of the keystream. In addition, the input for generating the message authentication code may also include the identifier of the first plaintext packet. If the input used by the first ECU to generate the message authentication code includes the identifier of the first plaintext packet, input used by the second ECU to generate the new message authentication code may also include the identifier of the first plaintext packet. The second ECU may obtain the identifier of the first plaintext packet from a packet header of the second ciphertext packet. In a possible implementation, the message authentication code may be a 128-bit character string.

In this application, to reduce load sent by the first ECU, in a possible implementation, a length occupied by a fresh value sent by the first ECU to the second ECU may be shortened. For example, the fresh value may be truncated. In other words, the first fresh value may be a truncated fresh value.

Figure 7:
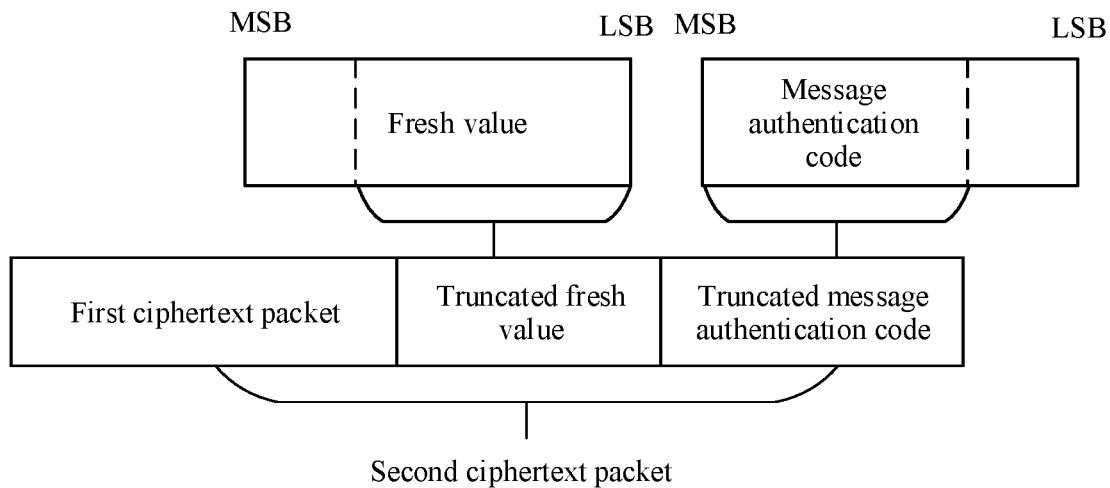
FIG. 7 is a schematic diagram of a cascaded structure of a truncated fresh value, a truncated message authentication code, and a ciphertext packet according to this application.

In a possible implementation, the truncated fresh value may be configured starting from LSB of the complete fresh value, or may be configured starting from MSB of the complete fresh value. To further reduce the load sent by the first ECU, the message authentication code may also be truncated. In a possible implementation, a truncated message authentication code may be configured starting from MSB, or may be configured starting from LSB. In FIG. 7, for example, the truncated message authentication code is configured starting from the MSB, and the truncated fresh value is configured starting from the LSB. The truncated fresh value, the truncated message authentication code, and the first ciphertext packet are arranged in a sequence, to obtain the second ciphertext, and the second ciphertext packet is sent to the second ECU. After receiving the second ciphertext packet, the second ECU obtains the first ciphertext packet, the truncated fresh value, and the truncated message authentication code from the second ciphertext packet. If the second ECU determines that the received truncated fresh value is greater than a fresh value that is in the fresh value locally stored in the second ECU and that corresponds to the truncated fresh value, it indicates that the received first plaintext packet is not under the replay attack. Further, optionally, the second ECU connects a fresh value that is in the locally stored fresh value and that is other than the fresh value corresponding to the truncated fresh value to the received truncated fresh value, to obtain the complete fresh value. If the second ECU determines that the received truncated fresh value is less than the fresh value that is in the locally stored fresh value and that corresponds to the truncated fresh value, the second ECU adds 1 to the fresh value that is in the locally stored fresh value and that is other than the fresh value corresponding to the truncated fresh value and then connects, to the received truncated fresh value, the fresh value to which 1 is added, to obtain the complete fresh value. For example, if the truncated fresh value is 5 bits configured starting from the LSB, and the fresh value locally stored in the second ECU is 15 bits, the fresh value corresponding to the truncated fresh value is 5 bits starting from LSB in the locally stored 15-bit fresh value, and the fresh value other than the fresh value corresponding to the truncated fresh value is 10 bits starting from MSB in the locally stored 15-bit fresh value.

It should be noted that the first fresh value in the input of the new message authentication code and the keystream generated by the second ECU is the complete fresh value.

In this application, when the first ECU sends the first ciphertext packet and the first fresh value to the second ECU, indication information may be included. The indication information may be used to indicate that the first ECU performs integrity protection on the first plaintext packet, or the indication information may be used by the first ECU to perform integrity protection and encryption protection on the first plaintext packet. After receiving the indication information, the second ECU may check, based on the indication information, whether integrity protection is performed on the ciphertext packet. Further, the indication information may be used to indicate that the first ECU performs encryption protection on the first plaintext packet; the indication information may be used to indicate that the first ECU does not perform any protection on the first plaintext packet; the indication information may be used to indicate that the first ECU performs encryption protection on the first plaintext packet and does not perform integrity protection; the indication information may be used to indicate that the first ECU performs integrity protection on the first plaintext packet and does not perform encryption protection; or the like.

In a possible implementation, the indication information may be information independent of the first ciphertext packet, or may be carried in the packet header of the first ciphertext packet or the second ciphertext packet. For example, the indication information may be identified by using one byte. For example, 0 may be used to indicate that no encryption protection is performed on the first plaintext packet, and 1 may be used to indicate that encryption protection is performed on the first plaintext packet; or 0 may be used to indicate that no integrity protection is performed on the first plaintext packet, and 1 may be used to indicate that integrity protection is performed on the first plaintext packet. For example, the indication information may also be indicated by using two bytes. For example, 00 indicates that neither integrity protection nor encryption protection is performed on the first plaintext packet; 01 indicates that integrity protection is not performed on the first plaintext packet but encryption protection is performed on the first plaintext packet; 10 indicates that integrity protection is performed on the first plaintext packet but encryption protection is not performed on the first plaintext packet; and 11 indicates that integrity protection and encryption protection are performed on the first plaintext packet. It should be understood that the packet header is not encrypted, and after receiving the second ciphertext packet or the first ciphertext packet, the second ECU may directly determine the indication information from the packet header.

It may be understood that, to implement the functions in the foregoing embodiments, the communication device includes a corresponding hardware structure and/or software module for performing each function. A person of ordinary skill in the art should easily be aware that, in combination with the modules and the method steps in the examples described in embodiments disclosed in this application, this application can be implemented by hardware or a combination of hardware and computer software. Whether a function is performed by hardware or hardware driven by computer software depends on particular application scenarios and design constraints of the technical solutions.

Figure 8:
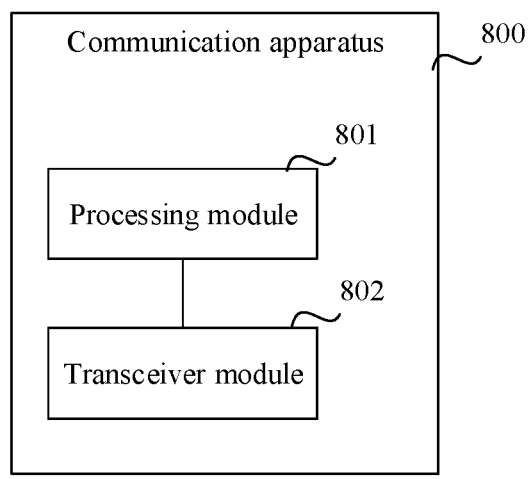
FIG. 8 is a schematic diagram of a structure of an ECU according to this application.
Figure 9:
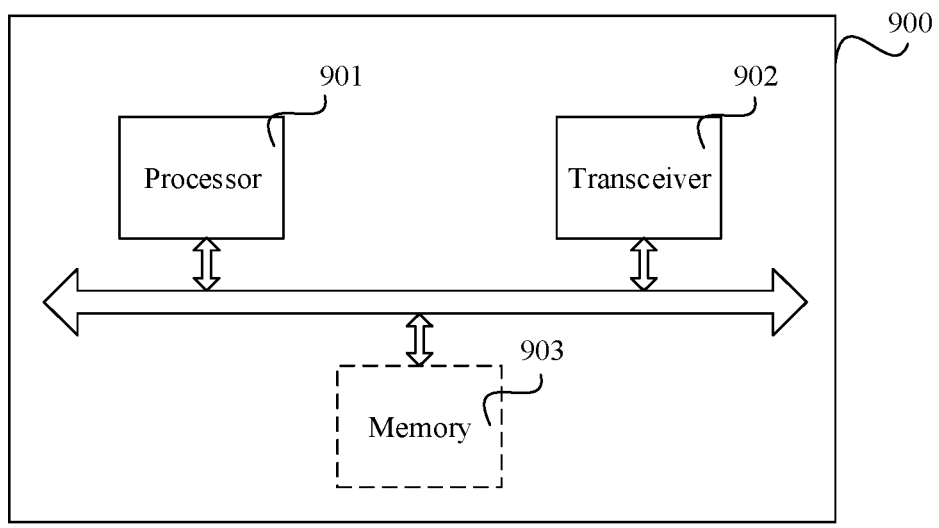
FIG. 9 is a schematic diagram of a structure of an ECU according to this application.

FIG. 8 and FIG. 9 each are a schematic diagram of a possible structure of a communication apparatus according to this application. The communication apparatuses may be configured to implement the functions of the first ECU or the second ECU in the foregoing method embodiments. Therefore, beneficial effects of the foregoing method embodiments can also be achieved. In this application, the communication apparatus may be the ECU shown in FIG. 1, or may be a module (for example, a chip) applicable to the ECU.

As shown in FIG. 8, the communication apparatus 800 may include a processing module 801 and a transceiver module 802. The communication apparatus 800 is configured to implement functions of the first ECU or the second ECU in the method embodiment shown in FIG. 2, FIG. 3, FIG. 4, FIG. 5, or FIG. 6.

When the communication apparatus 800 is configured to implement the functions of the first ECU in the method embodiment shown in FIG. 2, the processing module 801 is configured to perform an operation using a first key and a first fresh value to generate a keystream, and perform an exclusive OR operation using the keystream and a to-be-transmitted first plaintext packet to generate a first ciphertext packet, where the first fresh value is a value generated by a counter in the communication apparatus when the communication apparatus transmits a packet, and the counter is configured to record a quantity of packets transmitted by the communication apparatus; and the transceiver module 802 is configured to send the first ciphertext packet to a second ECU.

When the communication apparatus 800 is configured to implement the functions of the second ECU in the method embodiment shown in FIG. 2, the processing module 801 is configured to obtain the first ciphertext packet and the first fresh value, where the first ciphertext packet is from a first ECU, the first fresh value is a value generated by a counter in the first ECU when the first ECU sends a packet, and the counter is configured to record a quantity of packets transmitted by the first ECU; perform an operation using the first key and the first fresh value to generate the keystream; and perform an exclusive OR operation using the keystream and the first ciphertext packet to obtain the first plaintext packet.

For more detailed descriptions of the processing module 801 and the transceiver module 802, directly refer to the related descriptions in the method embodiment shown in FIG. 2. Details are not described herein again.

It should be understood that the processing module 801 in this embodiment of this application may be implemented by a processor or a processor-related circuit component, and the transceiver module 802 may be implemented by a transceiver or a transceiver-related circuit component.

Based on the foregoing content and a same concept, as shown in FIG. 9, this application further provides a communication apparatus 900. The communication apparatus 900 may include a processor 901 and a transceiver 902. The processor 901 and the transceiver 902 are coupled to each other. It may be understood that the transceiver 902 may be an interface circuit or an input/output interface. Optionally, the communication apparatus 900 may further include a memory 903, configured to: store instructions executed by the processor 901, store input data used by the processor 901 to run instructions, or store data generated after the processor 901 runs instructions.

When the communication apparatus 900 is configured to implement the method shown in FIG. 2, the processor 901 is configured to perform a function of the processing module 801, and the transceiver 902 is configured to perform a function of the transceiver module 802.

It may be understood that, the processor in embodiments of this application may be a central processing unit (CPU), or may be another general-purpose processor, a digital signal processor (DSP), an application-specific integrated circuit (ASIC), a field programmable gate array (FPGA) or another programmable logic device, a transistor logic device, a hardware component, or any combination thereof. The general-purpose processor may be a microprocessor or any conventional processor.

The method steps in embodiments of this application may be implemented in a hardware manner, or may be implemented in a manner of executing software instructions by the processor. The software instructions may include corresponding software modules. The software modules may be stored in a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a removable hard disk, a CD-ROM, or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a network device or a terminal device. Certainly, the processor and the storage medium may exist in the network device or the terminal device as discrete components.

All or some of the foregoing embodiments may be implemented by using software, hardware, firmware, or any combination thereof. When the software is used to implement embodiments, all or some of embodiments may be implemented in a form of a computer program product. The computer program product includes one or more computer programs or instructions. When the computer programs or the instructions are loaded and executed on a computer, the procedures or functions in embodiments of this application are all or partially performed. The computer may be a general-purpose computer, a dedicated computer, a computer network, a network device, a user device, or another programmable apparatus. The computer programs or the instructions may be stored in a computer-readable storage medium or may be transmitted from a computer-readable storage medium to another computer-readable storage medium. For example, the computer programs or the instructions may be transmitted from a website, computer, server, or data center to another website, computer, server, or data center in a wired or wireless manner. The computer-readable storage medium may be any usable medium accessible by a computer, or a data storage device, such as a server or a data center, integrating one or more usable media. The usable medium may be a magnetic medium such as a floppy disk, a hard disk, or a magnetic tape, may be an optical medium such as a digital video disc (DVD), or may be a semiconductor medium such as a solid-state drive (SSD).

In embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

Certainly, a person skilled in the art can make various modifications and variations to this application without departing from the protection scope of this application. This application is intended to cover these modifications and variations of this application provided that they fall within the scope of the following claims and their equivalent technologies.

What is claimed is:

1. A first vehicle-mounted device, comprising:
   at least one processor; and
   at least one memory coupled to the at least one processor and storing programming instructions for execution by the at least one processor to:
   generate a keystream based on a first key and a first fresh value, wherein the first fresh value is generated by a counter of the first vehicle-mounted device for counting packets transmitted by the first vehicle-mounted device;
   generate a first ciphertext packet based on performing an exclusive OR operation using the keystream and a first plaintext packet;
   send the first ciphertext packet to a second vehicle-mounted device;
   generate a message authentication code based on a second key, the first ciphertext packet, and the first fresh value, wherein the message authentication code is used by the second vehicle-mounted device to perform integrity check on the first plaintext packet;
   form a second ciphertext packet based on arranging the first ciphertext packet, the message authentication code, and the first fresh value; and
   send the second ciphertext packet to the second vehicle-mounted device.

2. The first vehicle-mounted device according to claim 1, wherein the first ciphertext packet is arranged after the first fresh value and before the message authentication code to form the second ciphertext packet.

3. The first vehicle-mounted device according to claim 1, wherein the programming instructions are for execution by the at least one processor to:
   generate a message authentication code based on a second key, the first plaintext packet, and the first fresh value, wherein the message authentication code is used by the second vehicle-mounted device to perform integrity check on the first plaintext packet;
   form a second ciphertext packet based on arranging the first ciphertext packet, the message authentication code, and the first fresh value; and
   send the second ciphertext packet to the second vehicle-mounted device.

4. The first vehicle-mounted device according to claim 1, wherein the programming instructions are for execution by the at least one processor to:
   generate a message authentication code based on a second key and the first plaintext packet, wherein the message authentication code is used by the second vehicle-mounted device to perform integrity check on the first plaintext packet;
   form a second plaintext packet based on arranging the first plaintext packet and the message authentication code; and
   generate a first ciphertext packet based on performing an exclusive OR operation using the keystream and the second plaintext packet.

5. The first vehicle-mounted device according to claim 1, wherein the programming instructions are for execution by the at least one processor to:
   generate a first key by using a shared key and a first preset parameter based on a key derivation algorithm, wherein the shared key is shared by the first vehicle-mounted device and the second vehicle-mounted device.

6. The first vehicle-mounted device according to claim 1, wherein the programming instructions are for execution by the at least one processor to:
   generate a second key based on a shared key and a second preset parameter based on a key derivation algorithm, wherein the shared key is shared by the first vehicle-mounted device and the second vehicle-mounted device.

7. The first vehicle-mounted device according to claim 1, wherein the programming instructions are for execution by the at least one processor to:
   send indication information to the second vehicle-mounted device, wherein the indication information indicates that the first vehicle-mounted device performs on the first plaintext packet (1) integrity protection or (2) integrity protection and encryption protection.

8. A second vehicle-mounted device, comprising:
   at least one processor; and
   at least one memory coupled to the at least one processor and storing programming instructions for execution by the at least one processor to:
   receive a second ciphertext packet from a first vehicle-mounted device, wherein the second ciphertext packet is formed by arranging a first ciphertext packet, a message authentication code, and a first fresh value;
   obtain the first ciphertext packet from the second ciphertext packet;
   obtain the first fresh value from the second ciphertext packet;
   obtain the message authentication code from the second ciphertext packet;
   in response to determining that the first fresh value is greater than a second fresh value, generate a new message authentication code based on a second key, the first ciphertext packet, and the first fresh value, wherein the second fresh value is locally stored after the second vehicle-mounted device receives the second ciphertext packet;
   determine that the new message authentication code is same as the obtained message authentication code;
   generate a keystream based on a first key and the first fresh value; and
   obtain a first plaintext packet based on performing an exclusive OR operation using the keystream and the first ciphertext packet.

9. The second vehicle-mounted device according to claim 8, wherein the first ciphertext packet is arranged after the first fresh value and before the message authentication code to form the second ciphertext packet.

10. The second vehicle-mounted device according to claim 8, wherein the programming instructions are for execution by the at least one processor to:

generate a first key by using a shared key and a first preset parameter based on a key derivation algorithm, wherein the shared key is shared by the first vehicle-mounted device and the second vehicle-mounted device.

11. The second vehicle-mounted device according to claim 8, wherein the programming instructions are for execution by the at least one processor to:
generate a second key by using a shared key and a second preset parameter based on a key derivation algorithm, wherein the shared key is shared by the first vehicle-mounted device and the second vehicle-mounted device.

12. The second vehicle-mounted device according to claim 8, wherein the programming instructions are for execution by the at least one processor to:
receive, indication information from the first vehicle-mounted device, wherein the indication information indicates that the first vehicle-mounted device performs (1) integrity protection or (2) integrity protection and encryption protection on the first plaintext packet.

13. A communication method, comprising:
generating, by a first vehicle-mounted device, a keystream based on a first key and a first fresh value, wherein the first fresh value is generated by a counter of the first vehicle-mounted device for counting packets transmitted by the first vehicle-mounted device;
generating, by the first vehicle-mounted device, a first ciphertext packet based on performing an exclusive OR operation using the keystream and a first plaintext packet;
sending, by the first vehicle-mounted device, the first ciphertext packet to a second vehicle-mounted device;
generating, by the first vehicle-mounted device, a message authentication code based on a second key, the first ciphertext packet, and the first fresh value, wherein the message authentication code is used by the second vehicle-mounted device to perform integrity check on the first plaintext packet;
forming, by the first vehicle-mounted device, a second ciphertext packet based on arranging the first ciphertext packet, the message authentication code, and the first fresh value; and
sending, by the first vehicle-mounted device, the second ciphertext packet to the second vehicle-mounted device.

14. The method according to claim 13, wherein the first ciphertext packet is arranged after the first fresh value and before the message authentication code to form the second ciphertext packet.

15. The method according to claim 13, wherein the method further comprises:
generating, by the first vehicle-mounted device, a first key by using a shared key and a first preset parameter based on a key derivation algorithm, wherein the shared key is shared by the first vehicle-mounted device and the second vehicle-mounted device.

16. The method according to claim 13, wherein the method further comprises:
generating, by the first vehicle-mounted device, a second key by using a shared key and a second preset parameter based on a key derivation algorithm, wherein the shared key is shared by the first vehicle-mounted device and the second vehicle-mounted device.

17. The method according to claim 13, wherein the method further comprises:

sending, by the first vehicle-mounted device, indication information to the second vehicle-mounted device, wherein the indication information indicates that the first vehicle-mounted device performs on the first plaintext packet (1) integrity protection or (2) integrity protection and encryption protection.

18. A communication method, comprising:
receiving, by a second vehicle-mounted device, a second ciphertext packet from a first vehicle-mounted device, wherein the second ciphertext packet is formed by arranging a first ciphertext packet, a message authentication code, and a first fresh value;
obtaining, by the second vehicle-mounted device, the first ciphertext packet from the second ciphertext packet;
obtaining, by the second vehicle-mounted device from the second ciphertext packet, the first fresh value generated by a counter of the first vehicle-mounted device for counting packets transmitted by the first vehicle-mounted device;
obtaining, by the second vehicle-mounted device, the message authentication code from the second ciphertext packet;
in response to determining that the first fresh value is greater than a second fresh value, generate a new message authentication code based on a second key, the first ciphertext packet, and the first fresh value, wherein the second fresh value is locally stored after the second vehicle-mounted device receives the second ciphertext packet;
determining, by the second vehicle-mounted device, that the new message authentication code is same as the obtained message authentication code;
generating, by the second vehicle-mounted device, a keystream based on a first key and the first fresh value; and
obtaining, by the second vehicle-mounted device, a first plaintext packet based on performing an exclusive OR operation using the keystream and the first ciphertext packet.

19. The method according to claim 18, wherein the first ciphertext packet is arranged after the first fresh value and before the message authentication code to form the second ciphertext packet.

20. The method according to claim 18, wherein the method further comprises:
generating, by the second vehicle-mounted device, the first key by using a shared key and a first preset parameter based on a key derivation algorithm, wherein the shared key is shared by the first vehicle-mounted device and the second vehicle-mounted device.

21. The method according to claim 18, wherein the method further comprises:
receiving, by the second vehicle-mounted device, indication information from the first vehicle-mounted device, wherein the indication information indicates that the first vehicle-mounted device performs (1) integrity protection or (2) integrity protection and encryption protection on the first plaintext packet.

22. The first vehicle-mounted device according to claim 1, wherein the programming instructions are for execution by the at least one processor to:
send, to the second vehicle-mounted device, a truncated fresh value truncated from the first fresh value.

23. The first vehicle-mounted device according to claim 22, wherein the truncated fresh value is configured by starting from a least significant bit (LSB) of the first fresh value.

24. The first vehicle-mounted device according to claim 5, wherein the first preset parameter is an algorithm type distinguisher.

25. The first vehicle-mounted device according to claim 6, wherein the second preset parameter is an algorithm type distinguisher.

26. The first vehicle-mounted device according to claim 10, wherein the first preset parameter is an algorithm type distinguisher.

27. The first vehicle-mounted device according to claim 11, wherein the second preset parameter is an algorithm type distinguisher.

28. The second vehicle-mounted device according to claim 8, wherein the first fresh value is a fragment of a second fresh value for generating the first ciphertext packet.

29. The second vehicle-mounted device according to claim 28, wherein the first fresh value is configured by starting from a least significant bit (LSB) of the second fresh value.

30. The second vehicle-mounted device according to claim 28, wherein the programming instructions are for execution by the at least one processor to:
obtain the second fresh value based on the first fresh value; and
generate the keystream based on the first key and the second fresh value.

31. The second vehicle-mounted device according to claim 30, wherein the programming instructions are for execution by the at least one processor to:
determine the first fresh value is bigger than a first part corresponding to the first fresh value in a third fresh value stored in the second vehicle-mounted device; and
obtain the second fresh value by connecting a second part other than the first part in the third fresh value and the first fresh.

32. The second vehicle-mounted device according to claim 30, wherein the programming instructions are for execution by the at least one processor to:
determine the first fresh value is smaller than a first part corresponding to the first fresh value in a third fresh value stored in the second vehicle-mounted device; and
obtain the second fresh value by connecting the first fresh and a sum of a second part other than the first part in the third fresh value and 1.

33. The second vehicle-mounted device according to claim 28, wherein the programming instructions are for execution by the at least one processor to:
update a third fresh value stored in the second vehicle-mounted device based on the first fresh value.

* * * * *